(12) United States Patent
Yamazaki

(10) Patent No.: US 8,175,194 B2
(45) Date of Patent: May 8, 2012

(54) SIGNAL RECEIVING APPARATUS AND SIGNAL PROCESSING METHOD

(75) Inventor: Mitsuo Yamazaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 12/939,854

(22) Filed: Nov. 4, 2010

(65) Prior Publication Data

US 2011/0129039 A1    Jun. 2, 2011

(30) Foreign Application Priority Data

Nov. 30, 2009    (JP) ................................. 2009-272774

(51) Int. Cl.
*H03D 3/00* (2006.01)
(52) U.S. Cl. ........................................ 375/322
(58) Field of Classification Search .............. 375/239, 375/354, 355, 362; 370/213; 329/313
See application file for complete search history.

(56) References Cited

U.S. PATENT DOCUMENTS

| | | | |
|---|---|---|---|
| 5,459,751 A | 10/1995 | Okamoto | |
| 5,544,065 A * | 8/1996 | Engel et al. | 702/75 |
| 5,691,665 A | 11/1997 | Ohtani | |
| 5,905,759 A * | 5/1999 | Ishida et al. | 375/282 |
| 6,788,245 B1 * | 9/2004 | Johnson | 342/32 |
| 6,968,279 B2 * | 11/2005 | Gfeller et al. | 702/79 |
| 7,957,464 B2 * | 6/2011 | Yamazaki | 375/239 |
| 2007/0103229 A1 * | 5/2007 | Billaud et al. | 329/313 |

FOREIGN PATENT DOCUMENTS

| | | |
|---|---|---|
| JP | 6-216778 | 8/1994 |
| JP | 9-098193 | 4/1997 |
| JP | 2004-328174 | 11/2004 |

OTHER PUBLICATIONS

Japanese Patent Application No. 2009-272774; Notice of Reasons for Rejection; Mailed Apr. 12, 2011 (English translation).

* cited by examiner

*Primary Examiner* — Khanh C Tran
(74) *Attorney, Agent, or Firm* — Blakely, Sokoloff, Taylor & Zafman LLP

(57) ABSTRACT

According to one embodiment, a signal receiving apparatus includes a first setting module, a calculator, a detection module, a generator, and a determination module. The first setting module is configured to set a rising or falling of an arbitrary high pulse as a starting point. The calculator is configured to calculate a sampling period based on intervals between a plurality of high pulses. The detector is configured to set a multiple of the sampling period from the starting point as reference points and to detect positions where the plurality of high pulses are generated from each of the reference points. The generator is configured to generate a histogram for the positions where the plurality of high pulses are generated. The determination module is configured to determine positions obtained by adding a value of a peak in the histogram to each of the reference points as sampling points.

10 Claims, 7 Drawing Sheets

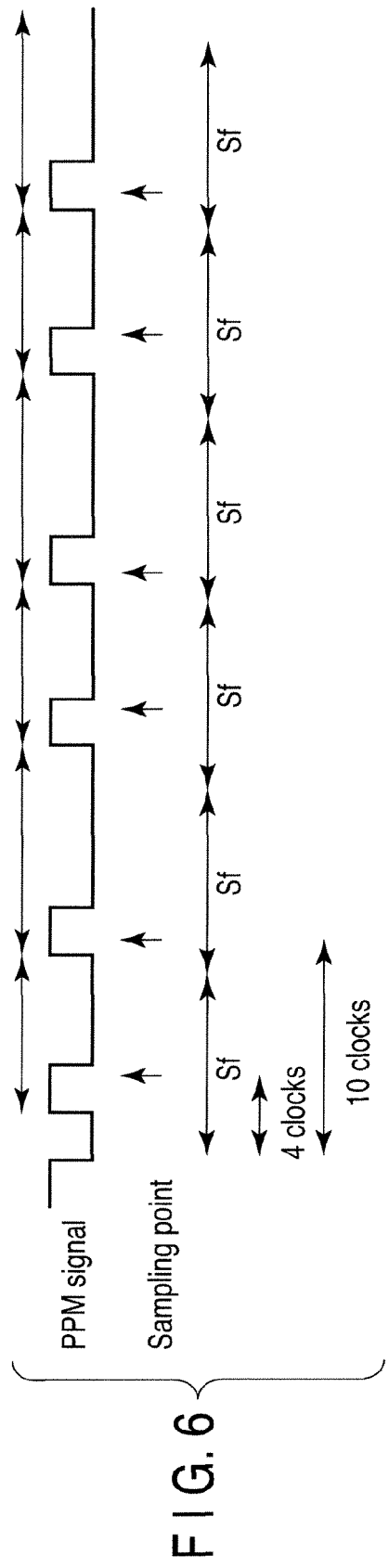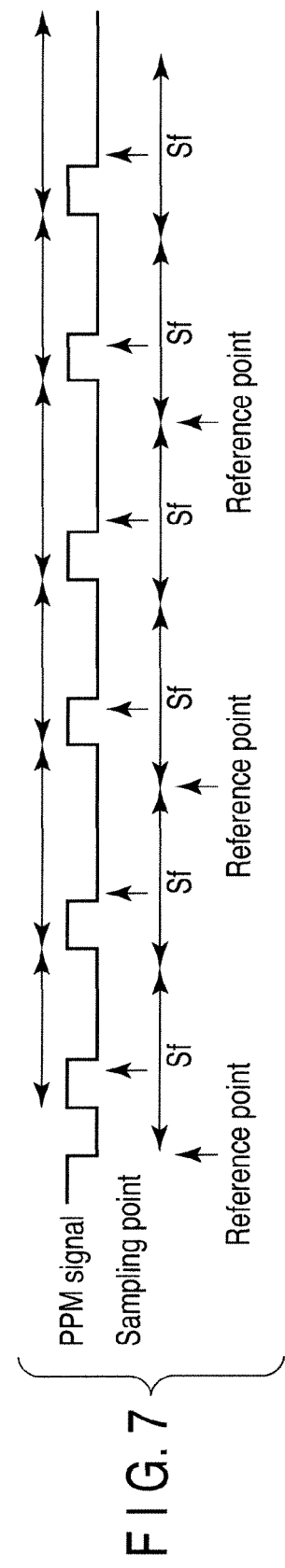

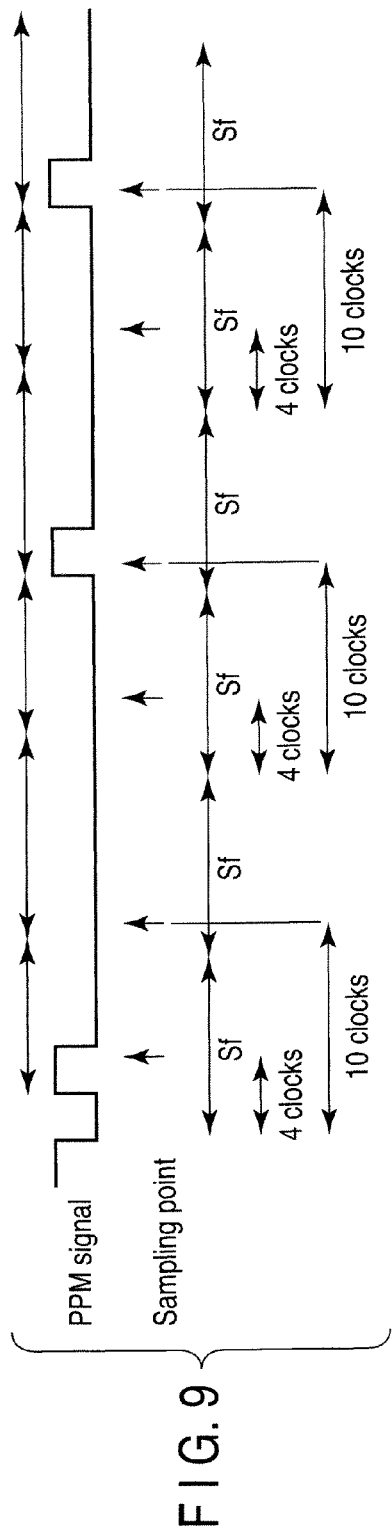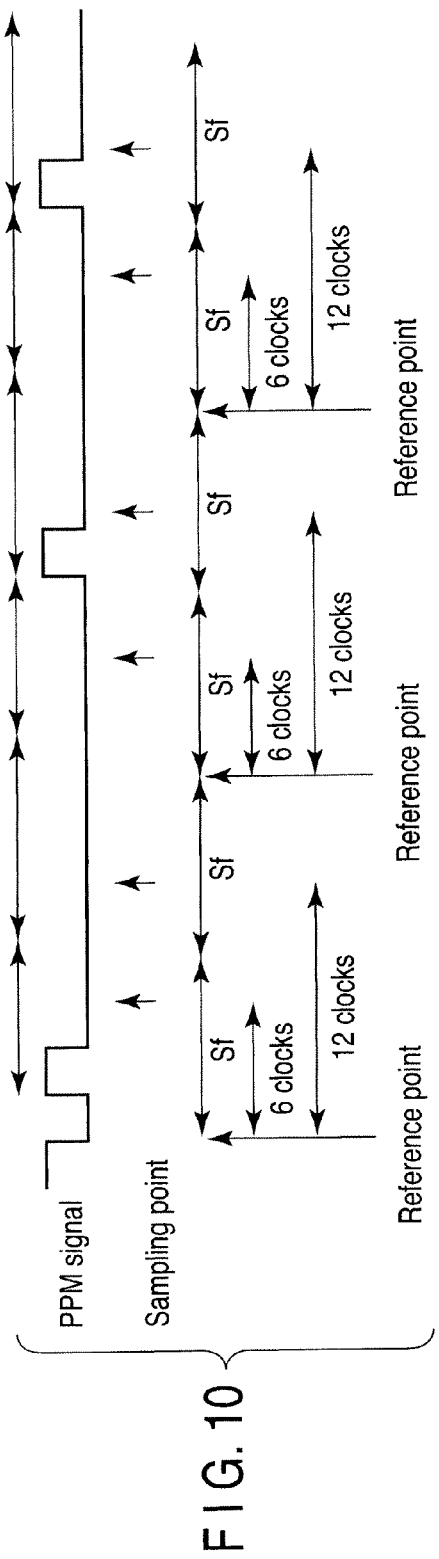
F I G. 9
F I G. 10

SIGNAL RECEIVING APPARATUS AND SIGNAL PROCESSING METHOD

CROSS-REFERENCE TO RELATED APPLICATIONS

This application is based upon and claims the benefit of priority from Japanese Patent Application No. 2009-272774, filed Nov. 30, 2009; the entire contents of which are incorporated herein by reference.

FIELD

Embodiments described herein relate generally to the technique for processing a pulse-position modulation signal.

BACKGROUND

Various modulation methods have been used to transmit a signal in both wireless communication and wire communication. One known signal modulation is pulse-position modulation (PPM).

In a PPM signal, when a signal level at given times from a reference point is encoded so as to go high (H) and low (L) in that order, this represents 0. When a signal level at given times from the reference point is encoded so as to go low (L) and high (H) in that order, this represents 1.

To reproduce the PPM signal reliably, it is necessary to sample the PPM signal accurately. In the process of transmitting the PPM signal, the pulse position varies. Accordingly, even if the PPM signal is sampled with a specific sampling period, there is a possibility that the PPM signal cannot be reproduced accurately due to a variation in the pulse position.

Jpn. Pat. Appln. KOKAI Publication No. 6-216778 has disclosed the configuration of an apparatus which compares the durations of the high (H) level/low (L) level of predetermined transmit data with the durations of the H level/L level of measured transmit data and adjusts the sampling timing according to the comparison result.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 6 is an exemplary timing chart showing sampling points in the embodiment.

FIG. 7 is an exemplary timing chart showing sampling points in a comparison example.

FIG. 9 is an exemplary timing chart showing sampling points in a comparison example.

FIG. 10 is an exemplary timing chart showing sampling points in the embodiment.

DETAILED DESCRIPTION

Various embodiments will be described hereinafter with reference to the accompanying drawings.

In general, according to one embodiment, a signal receiving apparatus includes a first setting module, a calculator, a detection module, a generator, a determination module, and reproduction module. The first setting module is configured to set a rising or falling of an arbitrary high pulse in a detection interval of a pulse-position modulation signal as a starting point. The calculator is configured to calculate a sampling period based on intervals between a plurality of high pulses in the detection interval. The detector is configured to set a multiple of the sampling period from the starting point as reference points in the detection interval and to detect positions where the plurality of high pulses are generated from each of the reference points. The generator is configured to generate a histogram for the positions where the plurality of high pulses are generated. The determination module is configured to determine positions obtained by adding a value of a peak value in the histogram to each of the reference points as sampling points in a to-be-reproduced signal interval of the pulse-position modulation signal. The reproduction module is configured to reproduce the to-be-reproduced signal interval based on the sampling points.

Figure 1:
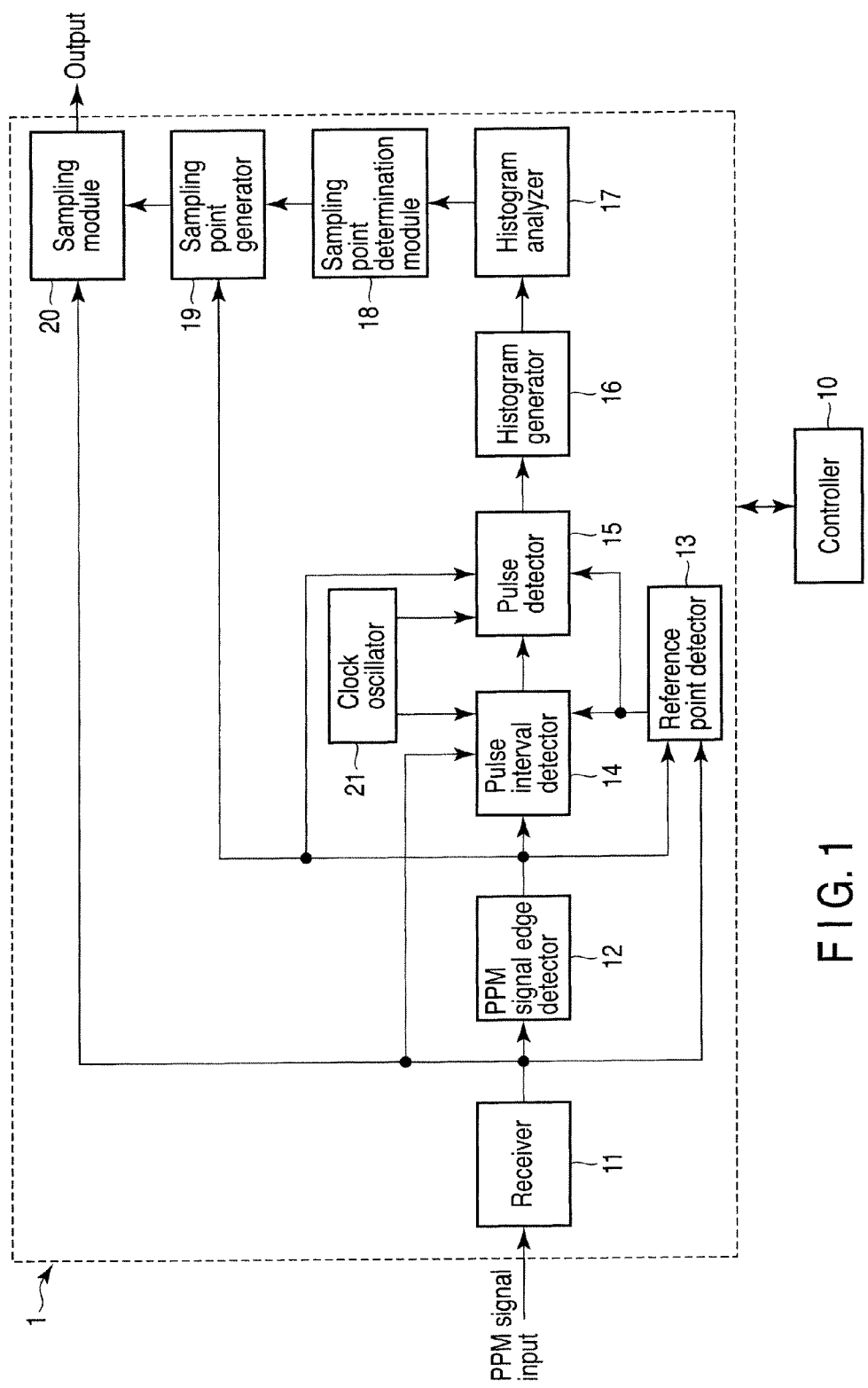
FIG. 1 is an exemplary block diagram schematically showing a signal receiving apparatus according to an embodiment.

Referring to the accompanying drawings, a signal receiving apparatus 1 according to an embodiment will be explained. The embodiment is configured to set sampling points of pulses to be reproduced (a signal to be reproduced) in a PPM signal to enable the signal receiving apparatus 1 to reproduce the PPM signal. FIG. 1 is a block diagram schematically showing a configuration of the signal receiving apparatus 1 according to the embodiment. The signal receiving apparatus 1 comprises a controller 10, a receiver 11, a PPM signal edge detector 12, a reference point detector 13, a pulse interval detector 14, a pulse detector 15, a histogram generator 16, a histogram analyzer 17, a sampling point determination module 18, a sampling point generator 19, a sampling module 20, and a clock oscillator 21. The embodiment may be realized by either circuitry or software. Hereinafter, the various parts of the configuration will be explained according to the PPM signal processing flow. The controller 10 controls the operation of each part of the signal receiving apparatus 1.

Figure 2A:
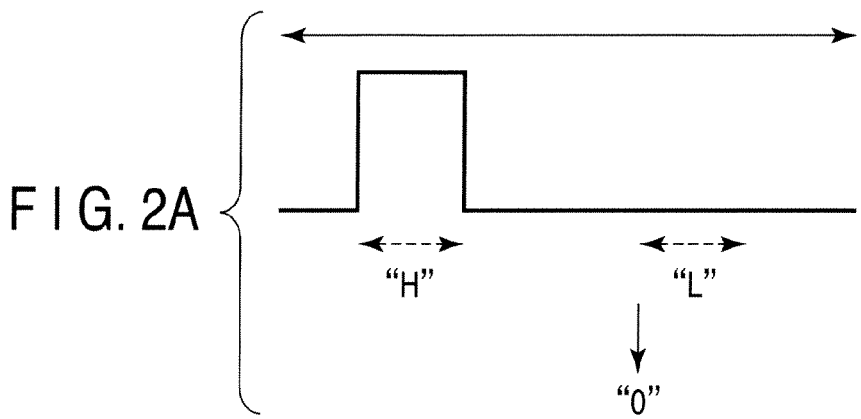
FIG. 2A is an exemplary general signal format of code in a PPM signal according to the embodiment.
Figure 2B:
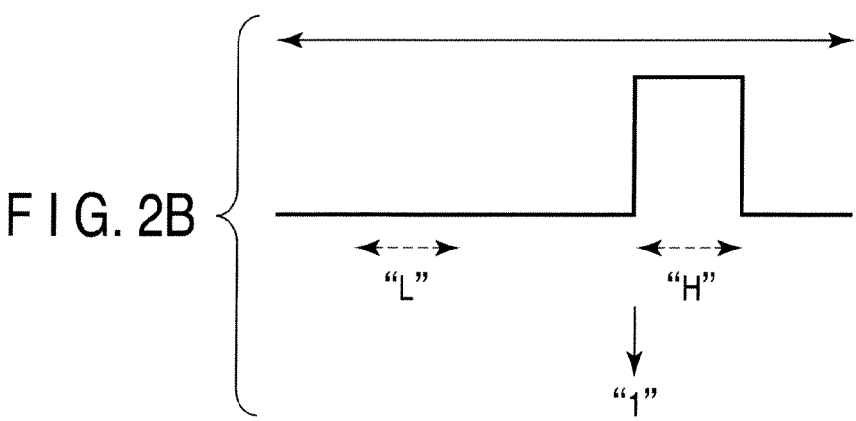
FIG. 2B is an exemplary general signal format of code in a PPM signal according to the embodiment.

The receiver 11 receives a PPM signal transmitted from an external unit. The receiver 11 may receive a PPM signal from the external unit by wireless communication or wire communication. The waveform of a PPM signal will be explained. FIG. 2 shows an example of a pulse format of code in the PPM signal. In the PPM signal, data 0 is encoded in such a manner that the signal level goes high (H) and low (L) in that order at given times from an arbitrarily determined reference point. Data 1 is encoded in such a manner that the signal level goes low (L) and high (H) in that order at given times from the arbitrarily determined reference point.

In the embodiment, a preamble interval is provided before a to-be-reproduced signal interval (an interval of a signal actually to be reproduced) in the PPM signal transmitted from the external unit to the signal receiving apparatus 1. In the preamble interval, there are consecutive pulse formats set so that a signal level at a determined time may be constantly kept high (or made high even if it is low) from an arbitrarily determined reference point. Accordingly, in the preamble interval, a repeated signal in a constant pulse format is transmitted.

The PPM signal edge detector 12 detects the rising edge and falling edge of the PPM signal in the preamble interval. The PPM signal edge detector 12 outputs an edge detection signal.

The reference point detector 13 detects a reference point for determining sampling points for the PPM signal in the preamble interval. The reference point detector 13 functions as a reference point setting module. The reference point detector 13 outputs a reference point detection signal. The reference point detector 13 sets the position of the rising edge or falling edge of an arbitrary high pulse in the preamble interval as a reference point (starting point).

Figure 3:
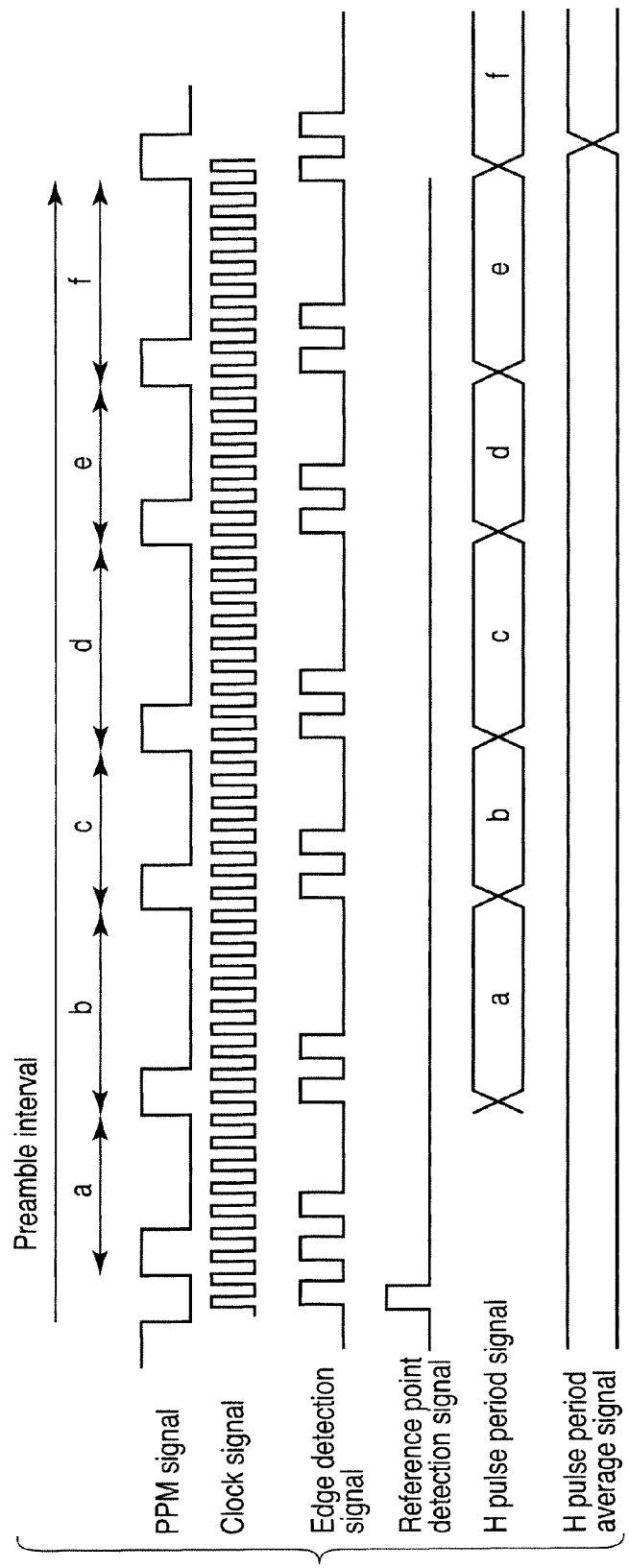
FIG. 3 is an exemplary timing chart showing various signal waveforms used in detecting a sampling period according to the embodiment.

The pulse interval detector 14 detects a pulse interval in the preamble interval and calculates a sampling period. The pulse interval detector 14 functions as a sampling period calculation module. FIG. 3 is a timing chart showing various signal waveforms used in detecting a sampling period with the pulse interval detector 14.

FIG. 3 shows the waveforms of a PPM signal, a clock signal, an edge detection signal, a reference point detection signal, an H (high) pulse period signal, and a H pulse period average signal with respect to the time axis. The PPM signal is input from the receiver 11. The clock signal is input from the clock oscillator 21. The edge detection signal is input from the PPM signal edge detector 12. The reference point detection signal is input from the reference point detector 13.

The pulse interval detector 14 detects a pulse interval in the preamble interval. Then, the pulse interval detector 14 calculates the average value of pulse intervals in the preamble interval and sets the value as a sampling period. Suppose there are an n number of pulses in the preamble interval. If pulse intervals are, for example, a, b, c, d, e, f, ..., the sampling period is calculated using the following equation: sampling period $Sf=(a+b+c+d+e+f+\ldots)/n$. The pulse interval detector 14 outputs a PPM period signal whose duration is twice the calculated sampling period. Suppose the sampling period corresponds to 8 clocks in the embodiment.

Figure 4:
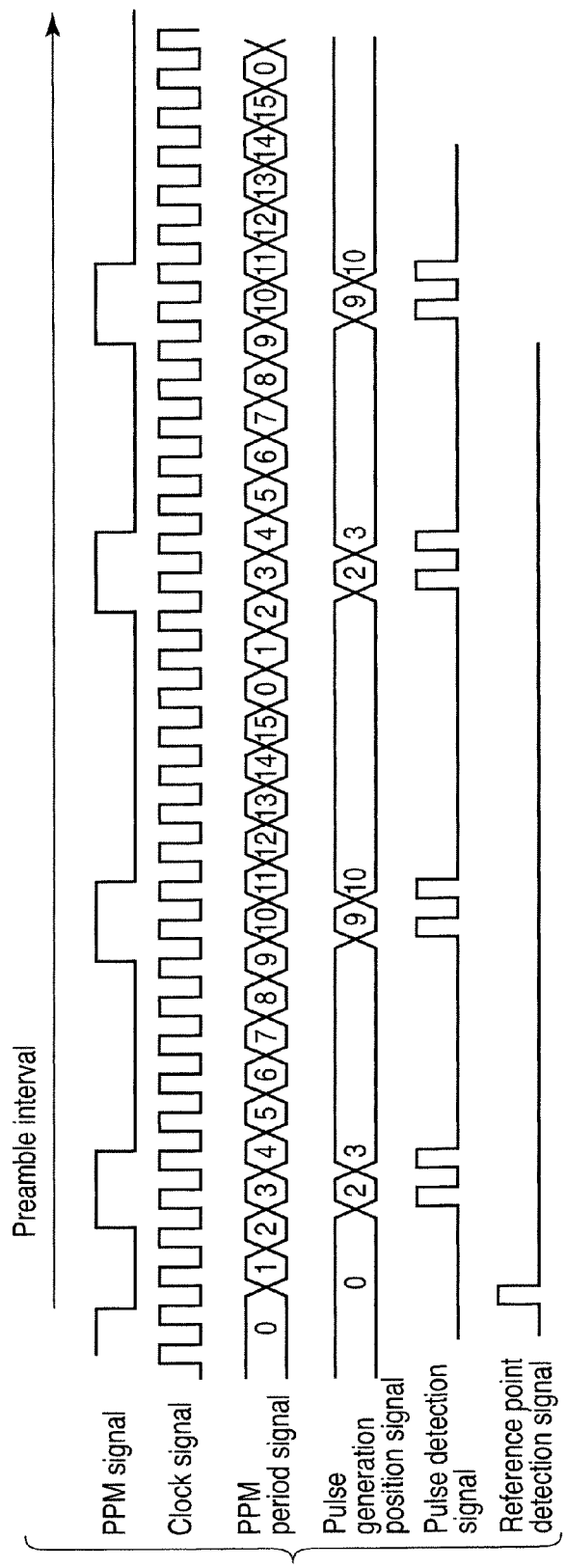
FIG. 4 is an exemplary timing chart showing various signal waveforms used in detecting a pulse generation position according to the embodiment.

The pulse detector 15 detects a pulse generation position in the preamble interval. FIG. 4 is a timing chart showing various signal waveforms used in detecting a pulse generation position with the pulse detector 15.

FIG. 4 shows the waveforms of a PPM signal, a clock signal, a PPM period signal, a pulse generation position signal, a pulse detection signal (edge detection signal), and a reference point detection signal with respect to the time axis. The PPM signal is not necessarily input to the pulse detector 15. The clock signal is input from the clock oscillator 21. The PPM period signal is input from the pulse interval detector 14. The pulse detection signal is input from the PPM signal edge detector 12. The reference point detection signal is input from the reference point detector 13.

The pulse detector 15 compares the clock signal with the PPM period signal, sets a reference point at intervals of twice the sampling period in the PPM period signal, and causes to correspond to the number of clocks from each of the reference points to pulse generation positions. The pulse detector 15 also functions as a reference point setting module. The numbers written on the PPM period signal in FIG. 4 represent the number of clocks from each of the reference points. A pulse generation position signal is caused to correspond to the number of clocks from each of the reference points.

The pulse detector 15 compares the PPM period signal, pulse detection signal, and reference point detection signal and detects a pulse generation position signal after the starting point in the preamble interval. First, the pulse detector 15 detects a position (or time) at which a high (H) pulse is generated from the starting point. Next, the pulse detector 15 detects a position (or time) at which a next high pulse is generated from the reference point. The pulse detector 15 carries out the same operation in the preamble interval. The pulse interval detector 14 outputs a pulse generation position signal which indicates the pulse generation position.

Figure 5A:
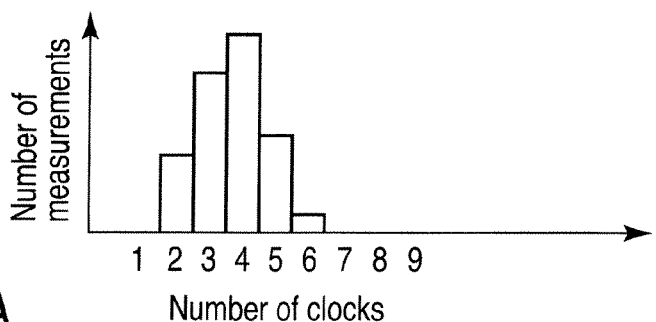
FIG. 5A is an exemplary histogram according to the embodiment.
Figure 5B:
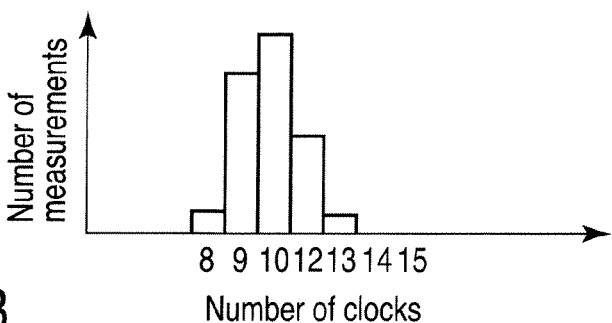
FIG. 5B is an exemplary histogram according to the embodiment.

The histogram generator 16 generates a histogram of the frequency of high pulses (the generation positions of high pulses) on the basis of the pulse generation position signal. FIGS. 5A and 5B show examples of a histogram generated by the histogram generator 16. In the histogram, the abscissa axis represents the number of clocks from the reference point and the ordinate axis represents the number of measurements in the preamble interval. FIG. 5A is a histogram showing the frequency of occurrence of high pulses in the first half of the period between reference points when twice the sampling period is set as one unit. FIG. 5B is a histogram showing the frequency of occurrence of high pulses in the second half of the period.

The histogram analyzer 17 can determine the sampling period (sampling frequency) to be 8 from the average value of the frequency of occurrence of high pulses in the histograms. Accordingly, the sampling period is 8 clocks. The histogram analyzer 17 determines the peak value of the frequency of occurrence of high pulses in the first half to be 4. Similarly, the histogram analyzer 17 determines the peak value of the frequency of occurrence of high pulses in the second half to be 10. The external unit transmits the signal in a constant pulse format in the preamble interval. However, the position of a high pulse in the PPM signal slips in the process of transmitting the PPM signal. In the histogram, the position at which a high pulse is generated varies significantly.

The sampling point determination module 18 acquires the number of clocks at which the frequency of occurrence of a high pulse in the first half and second half determined by the histogram analyzer 17 reaches a peak. The sampling point generator 19 generates sampling points on the basis of the reference point detection signal, PPM period signal, and the number of clocks at which the frequency of occurrence of a high pulse reaches a peak. The sampling point generator 19 functions as a determination module.

The sampling point generator 19 sets a sampling point of the first-half signal level to a position obtained by adding four clocks or the peak value of the frequency of occurrence of a high pulse in the first half, to the number of clocks $2 \times n$ ($n=0, 1, 2, \ldots$) times the sampling period from the reference point (e.g., the starting point, the rising edge or falling edge of the first pulse of a signal to be reproduced). Accordingly, sampling clock Shf from the reference point is expressed as $Shf=2 \times 8 \times n+4$ ($n=0, 1, 2, \ldots$).

In addition, the sampling point generator 19 sets a sampling point of the second-half signal level to a position obtained by adding ten clocks or the peak value of the frequency of occurrence of a high pulse in the second half, to the number of clocks $2 \times n$ ($n=0, 1, 2, \ldots$) times the sampling period from the reference point. Accordingly, sampling clock Shs from the reference point is expressed as $Shs=2 \times 8 \times n+10$ ($n=0, 1, 2, \ldots$).

The sampling module 20 samples the PPM signal at the sampling points generated by the sampling point generator

19. The sampling module 20 outputs the sampled PPM signal for reproduction. The sampling module 20 functions as a reproduction module.

FIG. 6 is a timing chart when Shf and Shs are used as sampling points. The sampling module 20 can sample the PPM signal at the sampling points shown in FIG. 6 to perform sampling accurately at the positions at which a high pulse is generated in the PPM signal.

Here, when the constant pulse format in the preamble interval of the PPM signal transmitted by the external unit is normal (or before the signal is transmitted and when there is no variation in the pulse position in the transmission process), the pulse period includes 8 clocks, the peak of the frequency of occurrence of the first-half high pulse corresponds to 4 clocks, and the peak of the second-half high pulse corresponds to 8+4=12 clocks. That is, the sampling point is at a position obtained by adding the number of clocks at which the frequency of occurrence of a high pulse reaches a peak to the number of clocks determined by a multiple of the sampling period from the reference point.

A sampling point when the peak of the frequency of occurrence of the first-half high pulse corresponds to 4 clocks and the peak of the frequency of occurrence of the second-half high pulse corresponds to 12 clocks will be explained. FIG. 7 is a timing chart in this case.

In a histogram of the frequency of occurrence of a high pulse in the PPM signal after transmission, the pulse format is not constant as in a normal operation due to the characteristic of the pulse transmission path. That is, the pulse interval is not constant and varies significantly. Therefore, if 4 clocks and 12 clocks are added to the number of clocks determined by a multiple of the sampling period to determine a sampling point, the signal receiving apparatus 1 will sample the PPM signal erroneously as shown in FIG. 7.

In a comparison example of FIG. 7, the signal receiving apparatus 1 performs sampling erroneously and cannot reproduce the PPM signal reliably. When the signal receiving apparatus 1 samples the PPM signal at sampling points set on the basis of the histogram of FIG. 6 as in the embodiment, the effect of a fluctuation or a variation in the pulse generation position can be alleviated as compared with the comparison example. As a result, the signal receiving apparatus 1 can sample the PPM signal accurately and therefore reproduce the PPM signal reliably.

While in the embodiment, an arbitrary interval (e.g., an interval of all the signals in a constant pulse format) in the preamble interval has been set as an interval for detecting a sampling point on the basis of an arbitrary high pulse (e.g., a first high pulse in a constant pulse format) in the preamble interval, the embodiment is not limited to this. For example, the interval for detecting a sampling point may be such that a fixed period (several pulses) from the start of an interval of a signal in a constant pulse format and a fixed period (several pulses) before the end of the interval are eliminated from the preamble interval. The controller 10 can arbitrarily set an interval for detecting a sampling point. The controller 10 functions as a detection period setting module. The reason is that, since signals differing in format from those in the constant format signal interval are present before and after the constant pulse format signal interval, this might have an effect on the signal interval.

Next, another embodiment will be explained. As described above, the signal receiving apparatus 1 detects sampling points for sampling a PPM signal on the basis of the frequency of occurrence of a high pulse in the preamble interval. Alternatively, the signal receiving apparatus 1 may detect sampling points on the basis of a to-be-reproduced signal interval other than the preamble interval of the PPM signal.

The pulse detector 15 detects the frequency of occurrence of a high pulse using a reference point which is the rising edge or falling edge of a high pulse in an arbitrary interval of a to-be-reproduced signal interval of the PPM signal. The histogram generator 16 generates a histogram showing the frequency of occurrence of a high pulse in an arbitrary interval of the to-be-reproduced signal interval. In the histogram, a plurality of peaks may occur, depending on the type of the PPM signal. The sampling point determination module 18 determines the optimum sampling point from the plurality of peak values.

The PPM-coded pulse in the to-be-reproduced signal interval may have the following pattern: for example, "H (high)" "L (low)", "L" "H." In this case, there are two peaks in the histogram.

Figure 8A:
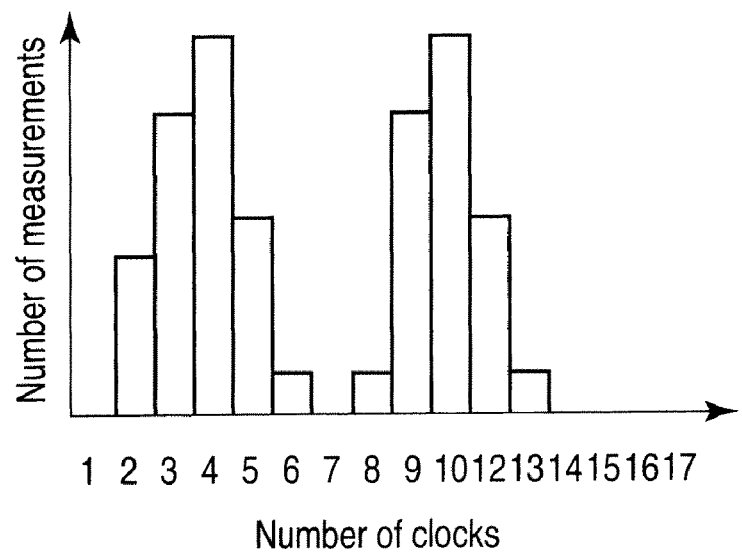
FIG. 8A is an exemplary histogram in the embodiment.
Figure 8B:
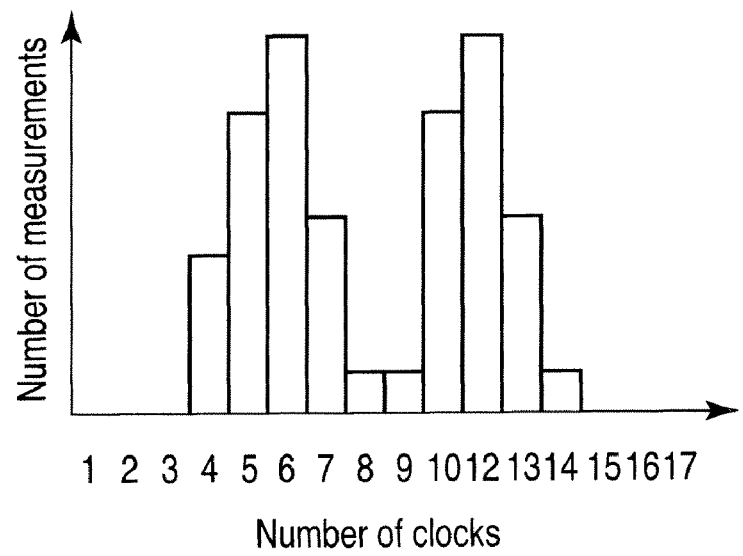
FIG. 8B is an exemplary histogram in the embodiment.

FIGS. 8A and 8B show examples of a histogram generated by the histogram generator 16. FIG. 8A is a histogram showing the frequency of occurrence of pulses in an arbitrary interval of the to-be-reproduced signal interval after transmission. FIG. 8B is a histogram showing the frequency of occurrence of pulses in an arbitrary interval of the to-be-reproduced signal interval before transmission (in a normal operation). The frequency of occurrence of a high pulse in the first half of the to-be-reproduced signal interval after transmission is in the range from 6 clocks to 4 clocks in a normal operation. The frequency of occurrence of a high pulse in the second half is in the range from 12 clocks to 10 clocks in a normal operation.

FIG. 9 is a timing chart showing sampling points generated on the basis of the histogram of FIG. 8B in a normal operation by way of comparison. In this case, the sampling module 20 cannot sample the PPM signal accurately in the to-be-reproduced signal interval in which, for example, "H (high)" "L (low)" "L" "H" "L" "H" pulses line up in that order. Specifically, the sampling module 20 cannot sample the PPM signal accurately because the sampling points deviate from a fourth and a sixth high position in the interval of FIG. 9.

FIG. 10 is a timing chart showing sampling points generated on the basis of the histogram of FIG. 8A in the embodiment. For example, a to-be-reproduced signal interval in which "H" "L" "L" "H" "L" "H" pulses line up in that order as shown in FIG. 9 will be considered. It is seen from the histogram of FIG. 8A that a first high pulse should be sampled with a fourth clock from the reference point and that a fourth high pulse should be sampled with a tenth clock from the reference point.

Accordingly, the sampling point generator 19 sets sampling clocks S1 and S2 from the reference point as follows: S1=2×8×n+4 (n=0, 1, 2, ... ) and S2=2×8×n+10 (n=0, 1, 2, ... ).

A sampling point of the fourth high pulse of FIG. 10 is determined using equation S2 as 2×8×n+10 (n=0, 1, 2, ... ). Similarly, a sampling point of the sixth high pulse is determined as 2×8×(n+1)+10 (n=0, 1, 2, ... ).

The controller 10 may generate sampling points in an arbitrary interval of the to-be-reproduced signal interval in the middle of reproducing the to-be-reproduced signal interval of the PPM signal and control the sampling point generator 19 so as to change the sampling points. Furthermore, the controller 10 may generate sampling points at fixed time intervals in the middle of reproducing the to-be-reproduced signal interval of the PPM signal and control the sampling point generator 19 so as to change the sampling points.

As described above, with this embodiment, when the PPM signal is sampled at sampling points set on the basis of a histogram of the frequency of occurrence of detected high pulses, the effect of a variation in the frequency of occurrence of pulses can be alleviated as compared with a case where the PPM signal is sampled at sampling points set on the basis of a histogram of the frequency of occurrence of high pulses in a normal operation. Accordingly, the signal receiving apparatus 1 can sample and reproduce the PPM signal accurately.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal receiving apparatus comprising:
    a first setting module configured to set a rising or falling of an arbitrary high pulse in a preamble interval of a pulse-position modulation signal as a starting point;
    a calculator configured to calculate a sampling period based on intervals between a plurality of high pulses in the preamble interval;
    a detector configured to set a multiple of the sampling period from the starting point as reference points in a detection interval and to detect positions where the plurality of high pulses are generated from the reference points;
    a generator configured to generate a histogram for the positions where the plurality of high pulses are generated;
    a determination module configured to determine positions obtained by adding a value of a peak in the histogram to the reference points as sampling points in a to-be-reproduced signal interval of the pulse-position modulation signal; and
    a reproduction module configured to reproduce the to-be-reproduced signal interval based on the sampling points.

2. The apparatus of claim 1, further comprising:
    a second setting module configured to set the preamble interval where the plurality of high pulses are repeated constantly, provided in a beginning part of the to-be-reproduced signal interval as the detection interval.

3. The apparatus of claim 2, wherein the second setting module is configured to eliminate a fixed period from a start of the preamble interval and a fixed period before a end of the preamble interval from the detection interval.

4. The apparatus of claim 1, wherein the detector is configured to set 2 n times (n≧0) the sampling period from the starting point as the reference points.

5. The apparatus of claim 1, wherein the calculator is configured to calculate an average of intervals between the plurality of high pulses as the sampling period.

6. The apparatus of claim 1, wherein the detector is configured to detect the positions where the plurality of pulses are generated from the reference points in a form of a number of clocks.

7. The apparatus of claim 1, wherein the determination module, when there are a plurality of peaks in the histogram, is configured to determine positions obtained by adding each of values of the plurality of peaks to the reference points as the sampling points.

8. The apparatus of claim 2, wherein the second setting module is configured to set a new detection interval in the to-be-reproduced signal interval in a middle of reproducing the to-be-reproduced signal interval and to change new sampling points determined by the determination module so that the new sampling points are used in the reproduction module.

9. The apparatus of claim 8, wherein the second setting module is configured to change the new detection interval at fixed time intervals in the middle of reproducing the to-be-reproduced signal interval.

10. A signal processing method comprising:
    setting a rising or falling of an arbitrary high pulse in a preamble interval of a pulse-position modulation signal as a starting point;
    calculating a sampling period based on intervals between a plurality of high pulses in the preamble interval;
    setting a multiple of the sampling period from the starting point as reference points in a detection interval;
    detecting positions where the plurality of high pulses are generated from the reference points;
    generating a histogram for the positions where the plurality of high pulses are generated;
    determining positions obtained by adding a value of a peak value in the histogram to the reference points as sampling points in a to-be-reproduced signal interval of the pulse-position modulation signal; and
    reproducing the to-be-reproduced signal interval based on the sampling points.

* * * * *